US011632365B2

(12) United States Patent
Rao Krishnagi et al.

(10) Patent No.: US 11,632,365 B2
(45) Date of Patent: Apr. 18, 2023

(54) SYSTEM AND METHOD FOR SMART AUTHENTICATION

(71) Applicant: JPMorgan Chase Bank, N.A., New York, NY (US)

(72) Inventors: Kumar Rao Krishnagi, Powell, OH (US); Kevin Carrier, Worthington, OH (US); Vineshkumar Dharmalingam, Lewis Center, OH (US); Ritu Shrivastava, Powell, OH (US); Ananth Rajasekaran, Columbus, OH (US); Najma Aden, Columbus, OH (US); Robert B Grant, Gahanna, OH (US); Matthew J Porter, Mechanicsburg, OH (US); Nalini S Boda, Lewis Center, OH (US); Mark Alan Wells, Dublin, OH (US); Vijay Kumar Perla, Westerville, OH (US); Laxman Dongisharapu, Hyderabad (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 21 days.

(21) Appl. No.: 17/333,659

(22) Filed: May 28, 2021

(65) Prior Publication Data
US 2022/0337576 A1 Oct. 20, 2022

(30) Foreign Application Priority Data
Apr. 15, 2021 (IN) .............................. 202111017495

(51) Int. Cl.
*H04L 29/06* (2006.01)
*H04L 9/40* (2022.01)
*H04L 67/1014* (2022.01)

(52) U.S. Cl.
CPC .......... *H04L 63/083* (2013.01); *H04L 63/166* (2013.01); *H04L 67/1014* (2013.01)

(58) Field of Classification Search
CPC .. H04L 63/083; H04L 63/166; H04L 67/1014
See application file for complete search history.

(56) References Cited

U.S. PATENT DOCUMENTS 7,512,967 B2 * 3/2009 Sentoff ................... G06F 21/41
726/14
8,799,639 B2 * 8/2014 Balazs ................ H04L 63/0815
713/152

(Continued)

OTHER PUBLICATIONS

Q. Xie, G. Wang, F. Xia and D. Chen, "Improvement of Provably Secure Self-Certified Proxy Convertible Authenticated Encryption Scheme," 2012 Fourth International Conference on Intelligent Networking and Collaborative Systems, 2012, pp. 360-364, doi: 10.1109/iNCoS.2012.44. (Year: 2012).*

*Primary Examiner* — Khalid M Almaghayreh
(74) *Attorney, Agent, or Firm* — Greenblum & Bernstein, P.L.C.

(57) ABSTRACT

Various methods, apparatuses/systems, and media for automatically establishing a communication between two or more applications that do not share a compatible authentication model are disclosed. A receiver receives a request from a first application to communicate with a second application, wherein the first application supports a first authentication model and the second application supports a second authentication model which is incompatible with the first authentication model. A processor utilizes a configurable gateway layer, in response to receiving the request, to mediate a communication between the first application and the second application; and routes the request from the first application to the configurable gateway layer. The configurable gateway layer translates the first authentication model (Continued)

to the second authentication model. The processor transmits a message to the second application and automatically establishes a communication between the first application and the second application in response to receiving the message by the second application.

15 Claims, 6 Drawing Sheets

(56) References Cited

U.S. PATENT DOCUMENTS

| | | | |
|---|---|---|---|
| 11,048,812 B2* | 6/2021 | Holt | G06F 21/45 |
| 2007/0174429 A1* | 7/2007 | Mazzaferri | H04L 63/102 |
| | | | 709/218 |
| 2013/0019018 A1* | 1/2013 | Rice | H04L 67/51 |
| | | | 709/226 |
| 2014/0359696 A1* | 12/2014 | Malli | H04L 63/102 |
| | | | 726/1 |
| 2016/0254950 A1* | 9/2016 | Lim | H04W 12/08 |
| | | | 709/220 |
| 2017/0127276 A1* | 5/2017 | Koo | H04L 63/0807 |
| 2020/0359218 A1* | 11/2020 | Lee | H04M 15/55 |
| 2021/0306320 A1* | 9/2021 | Squire | H04W 4/12 |

* cited by examiner

SYSTEM AND METHOD FOR SMART AUTHENTICATION

CROSS-REFERENCE TO RELATED APPLICATIONS

This application claims the benefit of priority from Indian Patent Application No. 202111017495, filed Apr. 15, 2021, which is herein incorporated by reference in its entirety.

TECHNICAL FIELD

This disclosure generally relates to application access, and, more particularly, to methods and apparatuses for implementing a smart authentication module that provides an interface to utilize an easily configurable gateway layer that can translate between incompatible authentication models.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

When applications communicate with one another securely over Hypertext Transfer Protocol (HTTP), they typically need to agree on a shared authentication model (e.g., basic authentication, OAuth, Security Assertion Markup Language (SAML), etc.) that will be leveraged by all parties. As is well known, SAML and OAuth are open standard protocols where SAML is primarily designed to authenticate a user, thereby providing user identity data to a service; and OAuth 2.0 is designed as an authorization protocol permitting a user to share access to specific resources with a service provider. In some cases, applications wishing to communicate do not both support the same authentication model thereby creating a considerable amount of work for application team members, e.g., requiring one or more parties to make a code change in order to support the previously unsupported authentication model.

SUMMARY

The present disclosure, through one or more of its various aspects, embodiments, and/or specific features or sub-components, provides, among other features, various systems, servers, devices, methods, media, programs, and platforms for implementing a smart authentication module that provides an interface to utilize an easily configurable gateway layer that can translate between incompatible authentication models, thereby automatically establishing a communication between two or more applications that do not share a compatible authentication model, but the disclosure is not limited thereto.

According to an aspect of the present disclosure, a method for automatically establishing a communication between two or more applications that do not share a compatible authentication model by utilizing one or more processors and one or more memories is disclosed. The method may include: receiving a request from a first application to communicate with a second application, wherein therein the first application supports a first authentication model and the second application supports a second authentication model which is incompatible with the first authentication model; utilizing a configurable gateway layer, in response to receiving the request, to mediate a communication between the first application and the second application; routing the request from the first application to the configurable gateway layer, translating, by the configurable gateway layer, the first authentication model to the second authentication model; transmitting, in response to translating, via the configurable gateway layer, a message to the second application, and automatically establishing a communication between the first application and the second application in response to receiving the message by the second application.

According to another aspect of the present disclosure, wherein the configurable gateway layer is implemented between the first application and the second application.

According to yet another aspect of the present disclosure, wherein, in response to translating, the first authentication model becomes compatible with the second authentication model to automatically establish the communication between the first application and the second application.

According to a further aspect of the present disclosure, the method may further include: configuring a load balancer to route the request from the first application to the configurable gateway layer.

According to an additional aspect of the present disclosure, wherein, when the first application wants to communicate with the second application for a first time, the method may further include: causing the first application to send a request to the configurable gateway layer, without an access token, that the first application wants to communicate with the second application; sending a request from the configurable gateway layer to an authentication server for validating the request sent by the first application; and validating, by the authentication server, the request sent by the first application based on verifying credential data of a user of the first application.

According to yet another aspect of the present disclosure, wherein the validating may further include: receiving an authentication code from the authentication server by the configurable gate layer; sending a request with the authentication code by the configurable gateway layer to the authentication server for an access token; validating the authentication code by the authentication server; sending, in response to validating, the access token from the authentication server to the configurable gateway layer; sending the access token from the configurable gateway layer to the first application; causing the first application to send the request to the configurable gateway layer with the access token; validating the access token by the authentication server and automatically establishing the communication between the first application and the second application in response to validating the access token.

According to a further aspect of the present disclosure, wherein, when the first application wants to communicate with the second application with an access token, the method may further include: causing the first application to send the request to the configurable gateway layer with the access token; validating the access token by the authentication server; and automatically establishing the communication between the first application and the second application in response to validating the access token.

According to yet another aspect of the present disclosure, a system for automatically establishing a communication between two or more applications that do not share a compatible authentication model is disclosed. The system include a receiver that receives a request from a first application to communicate with a second application, wherein the first application supports a first authentication model and the second application supports a second authentication model which is incompatible with the first authentication model; and a processor operatively coupled to the receiver via a communication network. The processor may be configured to execute the following: utilize a configurable gateway layer, in response to receiving the request, to mediate a communication between the first application and the second application; route the request from the first application to the configurable gateway layer; translate, by the configurable gateway layer, the first authentication model to the second authentication model; transmit, response to translating, via the configurable gateway layer, a message to the second application; and automatically establish a communication between the first application and the second application response to receiving the message by the second application.

According to an additional aspect of the present disclosure, wherein the processor configures a load balancer to route the request from the first application to the configurable gateway layer.

According to a further aspect of the present disclosure, (herein, when the first application wants to communicate with the second application for a first time, the processor may be further configured to: cause the first application to send a request to the configurable gateway layer, without an access token, that the first application wants to communicate with the second application; send a request from the configurable gateway layer to an authentication server for validating the request sent by the first application; and validate, by the authentication server, the request sent by the first application based on verifying credential data of a user the first application.

According to yet another aspect of the present disclosure, wherein in validating, the processor may be further configured to: receive an authentication code from the authentication server by the configurable gateway layer; send a request with the authentication code by the configurable gateway layer to the authentication server for an access token; validate the authentication code by the authentication server; send, in response to validating, the access token from the authentication server to the configurable gateway layer; send the access token from the configurable gateway layer to the first application; cause the first application to send the request to the configurable gateway layer with the access token; validate the access token by the authentication server; and automatically establish the communication between the first application and the second application in response to validating the access token.

According to an aspect of the present disclosure, wherein, when the first application wants to communicate with the second application with an access token, the processor may be further configured to: cause the first application to send the request to the configurable gateway layer with the access token; validate the access token by the authentication server; and automatically establish the communication between the first application and the second application in response to validating the access token.

According to yet another aspect of the present disclosure, a non-transitory computer eatable medium configured to store instructions for automatically establishing a communication between two or more applications that do not share a compatible authentication model is disclosed. The instructions, when executed, may cause a processor to perform the following: causing receiver to receive a request horn a first application to communicate with a second application, wherein the first application supports a first authentication model and the second application supports a second authentication model which is incompatible with the first authentication model; utilizing a configurable gateway layer, in response to receiving the request, to mediate a communication between the first application and the second application; routing the request from the first application to the configurable gateway layer; translating, by the configurable gateway layer, the first authentication model to the second authentication model; transmitting, in response to translating, via the configurable gateway layer, a message to the second application; and automatically establishing a communication between the first application and the second application in response to receiving the message by the second application.

According to yet another aspect of the present disclosure, wherein, when the first application wants to communicate with the second application for a first time, the instructions, when executed, may further cause the processor to perform the following: causing the first application to send a request to the configurable gateway layer, without an access token, that the first application wants to communicate with the second application; sending a request from the configurable gateway layer to an authentication server for validating the request sent by the first application; and validating, by the authentication server, the request sent by the first application based on verifying credential data of a user of the first application.

According to a further aspect of the present disclosure, wherein in validating, the instructions, when executed, may further cause the processor perform the following: receiving an authentication code from the authentication server by the configurable gateway layer; sending a request with the authentication code by the configurable gateway layer to the authentication server for an access token; validating the authentication code by the authentication server; sending, in response to validating, the access token from the authentication server to the configurable gateway layer; sending the access token from the configurable gateway layer to the first application; causing the first application to send the request to the configurable gateway layer with the access token; validating the access token by the authentication server; and automatically establishing the communication between the first application and the second application in response to validating the access token.

According to an additional aspect of the present disclosure, wherein, when the first application ants to communicate with the second application with an access token, the instructions, when executed, further cause the processor to perform the following: causing the first application to send the request to the configurable gateway layer with the access token; validating the access token by the authentication server; and automatically establishing the communication between the first application and the second application in response to validating the access token.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
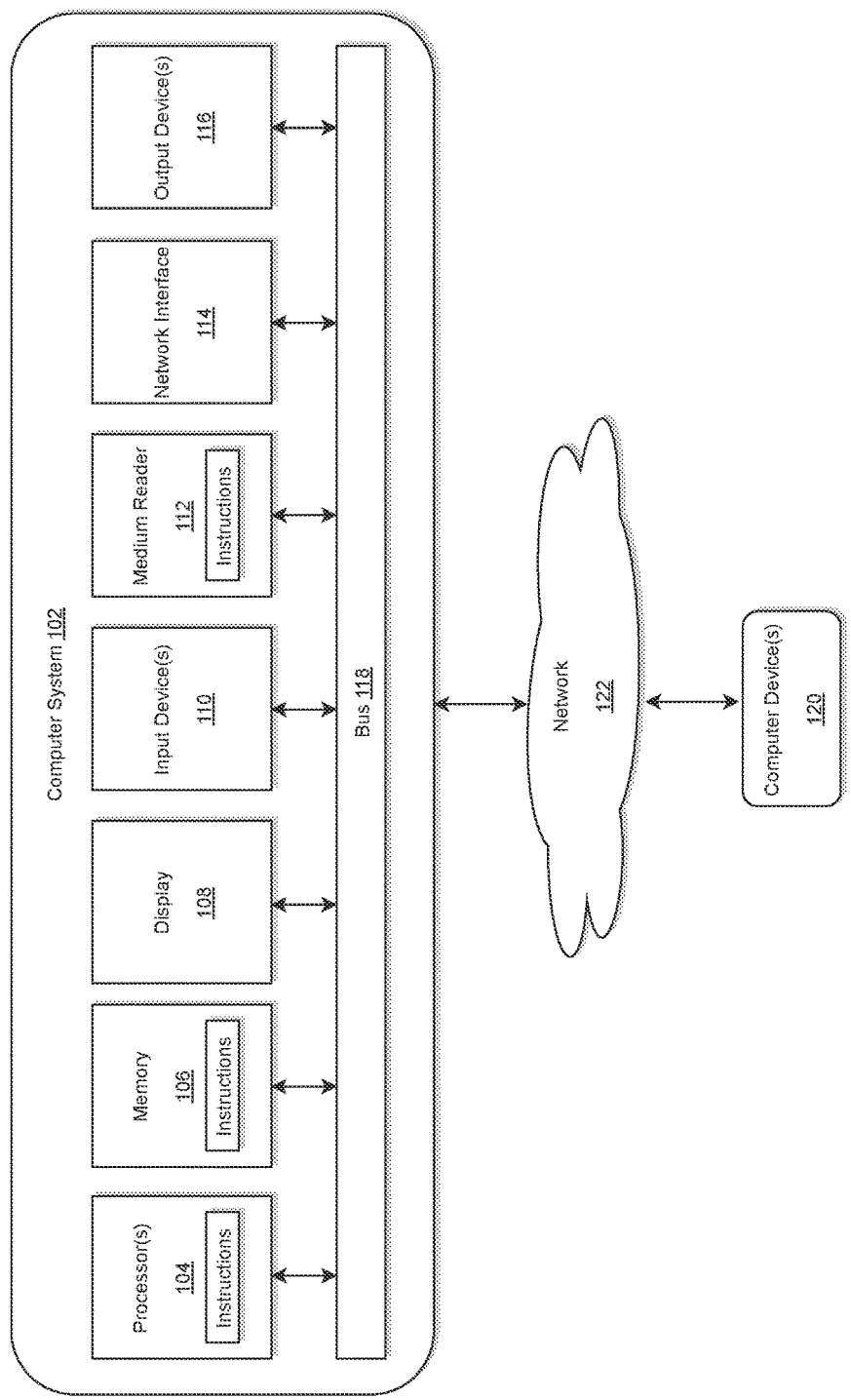
FIG. 1 illustrates a computer system for implementing a smart authentication module in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardwire, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 is an exemplary system for use in implementing a smart authentication module that provides an interface to create an easily configurable gateway layer that can translate between incompatible authentication models in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitory an place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecured and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known displa.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

As described herein, various embodiments provide optimized processes of implementing a smart authentication module that provides an interface to utilize an easily configurable gateway layer that can translate between incompatible authentication models, thereby automatically establishing a communication between two or more applications that do not share a compatible authentication model, but the disclosure is not limited thereto.

Figure 2:
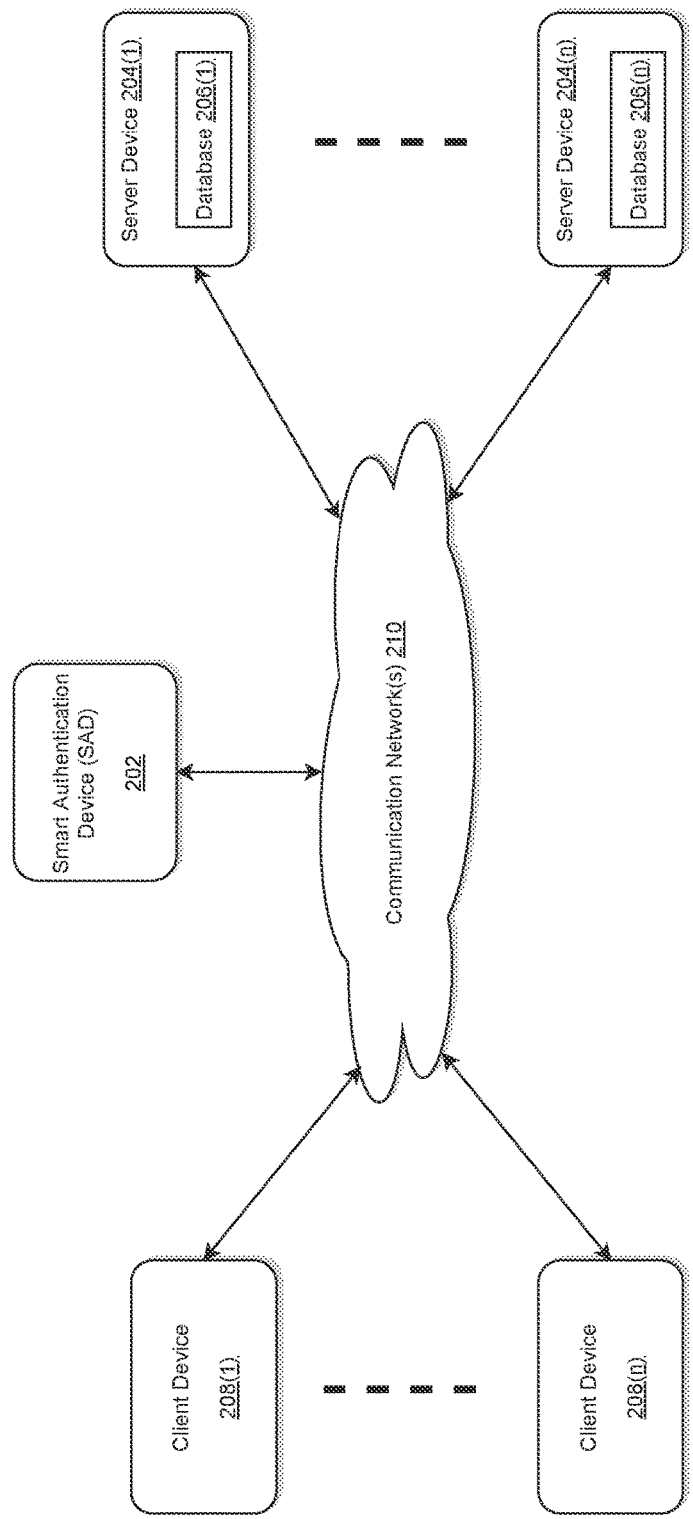
FIG. 2 illustrates an exemplary diagram of a network environment with a smart authentication device in accordance with an exemplary embodiment.

Referring to FIG. 2, a schematic of an exemplary network environment 200 for implementing a smart authentication device (SAD) of the instant disclosure is illustrated.

According to exemplary embodiments, the above-described problems associated with conventional methods and systems may be overcome by implementing an SAD 202 as illustrated in FIG. 2 by implementing a smart authentication module that provides an interface to utilize an easily configurable gateway layer that can translate between incompatible authentication models, thereby automatically establishing a communication between two or more applications that do not share a compatible authentication model, but the disclosure is not limited thereto.

The SAD 202 may be the same or similar to the computer system 102 as described with respect to FIG. 1.

The SAD 202 may store one or more applications that can include executable instructions that, when executed by the SAD 202, cause the SAD 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the SAD 202 itself, may be located in virtual server(s) running in a cloud-based computing environment rather than being tied to one or more specific physical network computing devices. Also, the application(s) may be running in one or more virtual machines (VMs) executing on the SAD 202. Additionally, in one or more embodiments of this technology, virtual machine(s) running on the SAD 202 may be managed or supervised by a hypervisor.

In the network environment 200 of FIG. 2, the SAD 202 is coupled to a plurality of server devices 204(1)-204(n) that hosts a plurality of databases 206(1)-206(n), and also to a plurality of client devices 208(1)-208(n) via communication network(s) 210. A communication interface of the SAD 202, such as the network interface 114 of the computer system 102 of FIG. 1, operatively couples and communicates between the SAD 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the SAD 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The SAD 202 may be a standalone device or integrated with one or more other devices or apparatuses, such as one or more of the server devices 204(1)-204(n), for example. In one particular example, the SAD 202 may be hosted by one of the server devices 204(1)-204(n), and other arrangements are also possible. Moreover, one or more of the devices of the SAD 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the SAD 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the SAD 202 that may be configured for implementing a smart authentication module that provides an interface to utilize an easily configurable gateway layer that can translate between incompatible authentication models, thereby automatically establishing a communication between two or more applications that do not share a compatible authentication model, but the disclosure is not limited thereto.

Accordingly, the client devices 208(1)-208(n) may be mobile computing devices, desktop computing devices, laptop computing devices, tablet computing devices, virtual machines (including cloud-based computers), or the like, that host at, e-mail, or voice-to-text applications, of other document collaborative software for example.

The client devices 208(1)-208(n) may run interface applications, such as standard web browsers or standalone client applications, which may provide an interface to communicate with the SAD 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the SAD 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the SAD 202, the server devices 204(1)-204(n), or the client devices 208(1)-208(n), for example, may be configured to operate as virtual instances on the same physical machine. For example, one or more of the SAD 202, the server devices 204(1)-204(n), or the client devices 208(1)-208(n) may operate on the same physical device rather than as separate devices communicating through communication network(s) 210. Additionally, there may be more or fewer SADs 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples, The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
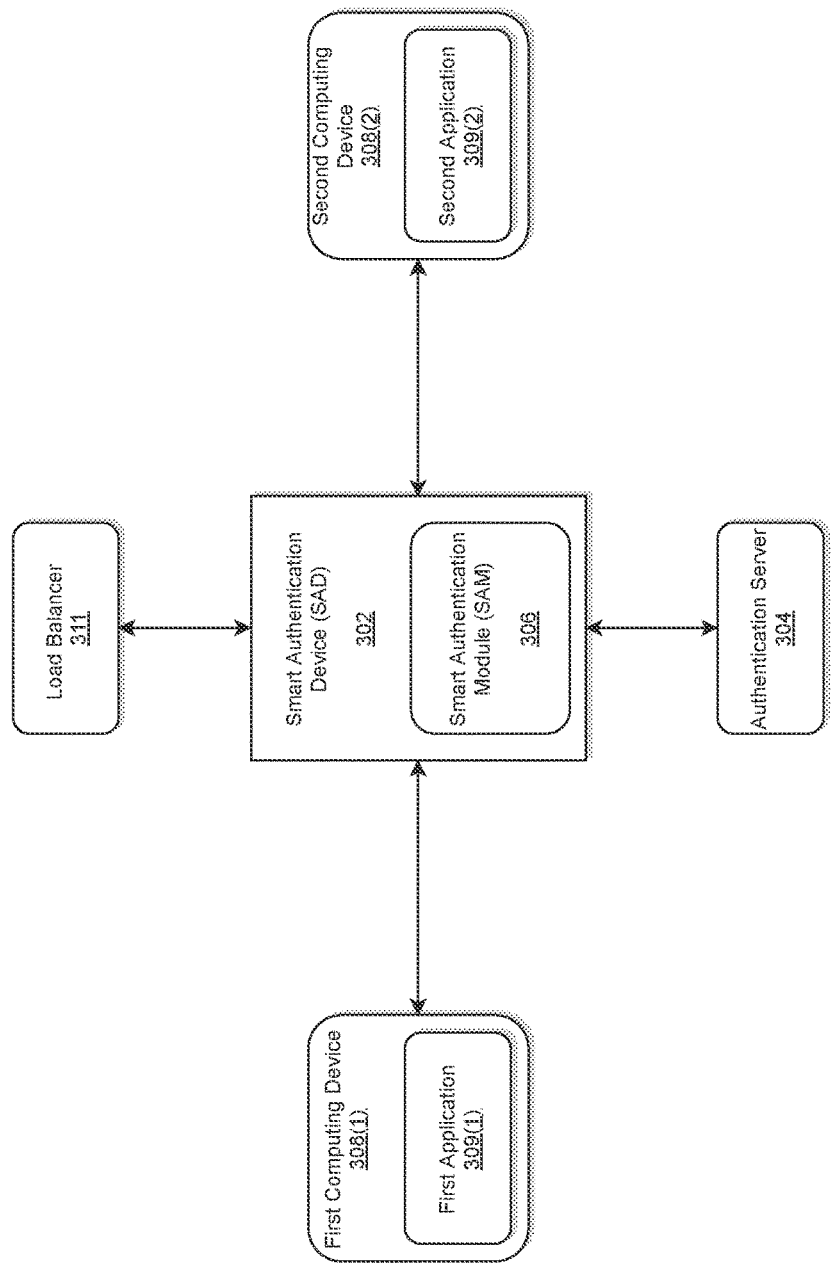
FIG. 3 illustrates a system diagram for implementing a smart authentication device with a smart authentication module in accordance with an exemplary embodiment.

FIG. 3 illustrates a system diagram 300 for implementing an SAD with a smart authentication module (SAM) in accordance with an exemplary embodiment.

Referring to FIGS. 2 and 3, as illustrated in FIG. 3, an SAD 302 including an SAM 306 may be connected to an authentication server 304, a first computing device 308(1), a second computing device 308(2), and a load balancer 311 via a communication network 210 (as illustrated in FIG. 2). The first computing device 308(1) may be utilized by a user of the first application 309(1) and the second computing device 308(2) may be utilized by a user of the second application 309(2), but the disclosure is not limited thereto. According to exemplary embodiments, the SAM 306 may be implemented within the first computing device 308(1) and/or the second computing device 308(2), but the disclosure is not limited thereto.

According to exemplary embodiment, the SAD 302 is described and shown in FIG. 3 as including the SAM 306, although it may include other rules, policies, modules, databases, or applications, for example. According to exemplary embodiments, a database may be embedded within the SAD 302. Although only one authentication server 304 is illustrated in FIG. 3, according to exemplary embodiments, a plurality of authentication server 304 may be provided depending on required authentication services. According to exemplary embodiments, the authentication server 304 may be any types of known authentication server that provides desired authentication service, but the disclosure is not limited thereto. For example, the authentication server 304 may also be a database as a text file. Such database may include one or more memories configured to store login information data files, data content, API specification definition file (e.g., in JSON format), user profile data, etc., but the disclosure is not limited thereto. For example, the database may include one or more memories configured to store information including: rules, programs, script, authentication information, log data, etc., but the disclosure is not limited thereto. According to exemplary embodiments, the SAM 306 may be configured to be storage platform agnostic—configured to be deployed across multiple storage layers.

According to exemplary embodiments, the SAM 306 may be configured to receive feed of data from the authentication server 304 via the communication network 310. According to exemplary embodiments, the authentication server 304 may also be a private cloud-based database that supports user authentication, database security, and integration with existing databases and developments as well as stores open API specification definition file (i.e., in JSON format) corresponding to an application, but the disclosure is not limited thereto.

As will be described below, the SAM 306 may provide an interface to utilize an easily configurable gateway layer that can translate between incompatible authentication models, thereby automatically establishing a communication between two more applications that do not share a compatible authentication model, but the disclosure is not limited thereto.

For example, as will be described below, the SAM 306 may be configured to: receive a request from a first application 309(1) to communicate with a second application 309(2), wherein the first application supports a first authentication model and the second application supports a second authentication model which is incompatible with the first authentication model; utilize a configurable gateway layer, in response to receiving the request, to mediate a communication between the first application 309(1) and the second application 309(2); route the request from the first application 309(1) to the configurable gateway layer; translate, by the configurable gateway layer, the first authentication model to the second authentication model; transmit, in response to translating, via the configurable gateway layer, a message to the second application 309(2); and automatically establish a communication between the first application 309(1) and the second application 309(2) in response to receiving the message by the second application 309(2), but the disclosure is not limited thereto.

The first computing device 308(1) and the second computing device 308(2) are illustrated as being communication with the SAD 302. In this regard, the first computing device 308(1) and the second computing device 308(2) may be "clients" of the SAD 302 and are described herein as such. Nevertheless, it is to be known and understood that the first computing device 308(1) and the second computing device 308(2) need not necessarily be "clients" of the SAD 302, or any entity described in association therewith herein. Any additional or alternative relationship may exist between either or both of the first computing device 308(1) and the second computing device 308(2) and the SAD 302, or no relationship may exist.

One of the first computing device 308(1) and the second computing device 308(2) may be, for example, a smart phone or a personal computer. Of course, the first computing device 308(1) and the second computing device 308(2) may be any additional device described herein. According to exemplary embodiments, the authentication server 304 may be the same or equivalent to the server device 204 as illustrated in FIG. 2.

The process may be executed via the communication network 210 (as illustrated in FIG. 2), which may comprise plural networks as described above. For example, in an exemplary embodiment, either one or both of the first computing device 308(1) and the second computing device 308(2) may communicate with the SAD 302 via broadband or cellular communication. Of course, these embodiments are merely exemplary and are not limiting or exhaustive.

Figure 4:
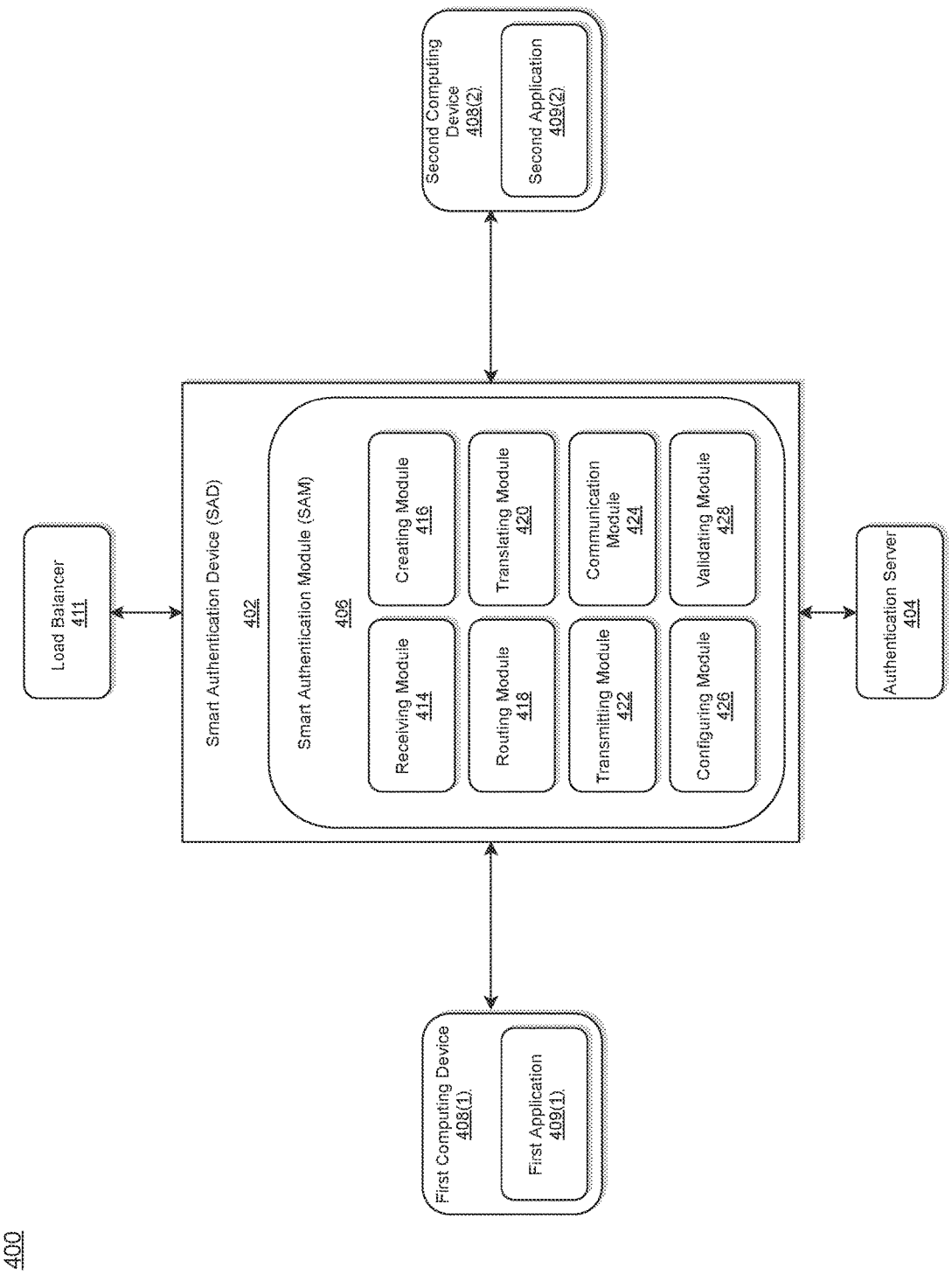
FIG. 4 illustrates a system diagram for implementing a smart authentication module of FIG. 3 in accordance with an exemplary embodiment.

FIG. 4 illustrates a system diagram for implementing a smart authentication module (S) of FIG. 3 in accordance with an exemplary embodimen.

As illustrated in FIG. 4, the system 400 may include a smart authentication switch device (SAD) 402 within which a SAM 406 may be embedded, an authentication server 404, a first computing device 408(1), a second computing device 408(2), and a load balancer 411. According to exemplary embodiments, the SAD 402, SAM 406, the authentication server 404, the first computing device 408(1), the second computing device 408(2), and the load balancer 411 as illustrated in FIG. 4 may be the same or similar to the SAD 302, the SAM 306, the authentication server 304, the first computing device 308(1), the second computing device 308(2), and the load balancer 411, respectively, as illustrated in FIG. 3.

As illustrated in FIG. 4, the SAM 406 may include a receiving module 414, a creating module 416, a routing module 418, a translating module 420, a transmitting module 422, a communication module 424, a configuring module 426, and a validating module 428. According to exemplary embodiments, the SAD 402 may be embedded within either one of the first computing device 408(1) or the second computing device 408(2).

According to exemplary embodiments, the SAM 406 may be implemented via user interfaces, e.g., web user interface, but the disclosure is not limited thereto, and may be integrated with a private cloud platform and a distributed operating system platform via the SAM 406 and an authentication service, but the disclosure is not limited thereto.

Referring to FIGS. 2 and 4, the process may be executed via the communication module 424 and the communication network 210, which may comprise plural networks as described above. For example, in an exemplary embodiment, the various components of the SAM 406 may communicate with the authentication server 404, and the load balancer 411 via the communication module 424 and the communication network 210. Of course, these embodiments are merely exemplary and are not limiting or exhaustive.

According to exemplary embodiments, the communication network 210 and the communication module 424 may be configured to establish a link between the authentication server 404, the first computing device 408(1), the second computing device 408(2) and the SAM 406.

According to exemplary embodiments, each of the receiving module 414, creating module 416, routing module 418, translating module 420, transmitting module 422, communication module 424, configuring module 426, and the validating module 428 may be implemented by microprocessors or similar, they may be programmed using software (e.g., microcode) to perform various functions discussed herein and may optionally be driven by firmware and/or software. Alternatively, each of the receiving module 414, creating module 416, routing module 418, translating module 420, transmitting module 422, communication module 424, configuring module 426, and the validating module 428 may be implemented by dedicated hardware, or as a combination of dedicated hardware to perform some functions and a processor (e.g., one or more programmed microprocessors and associated circuitry) to perform other functions. Also, according to exemplary embodiments, each of the receiving module 414, creating module 416, routing module 418, translating module 420, transmitting module 422, communication module 424, configuring module 426, and the validating module 428 may be physically separated into two or more interacting and discrete blocks, units, devices, and/or modules without departing from the scope of the inventive concepts.

According to exemplary embodiments, each of the receiving module 414, creating module 416, routing module 418, translating module 420, transmitting module 422, communication module 424, configuring module 426, and the validating module 428 of the SAM 406 may be called by corresponding API, but the disclosure is not limited thereto.

Referring to FIG. 4, the receiving module 414 may be configured to receive a request from a first application 409(1) to communicate with a second application 409(2). The first application 409(1) may support a first authentication model, i.e., an SAML authentication model, but the disclosure is not limited thereto. The second application may support a second authentication model, i.e., an OAuth 2.0 authentication model, but the disclosure is not limited thereto. SAML authentication model may be incompatible with the OAuth 2.0 authentication model.

According to exemplary embodiments, the creating module 416 may be configured to create a configurable gateway layer, and the SAM 406 may utilize the configurable gateway layer, in response to receiving the request from the receiving module 414, to mediate a communication between the first application 409(1) and the second application 409(2).

According to exemplary embodiments, the routing module 418 may be configured to route the request from the first application 409(1) to the configurable gateway layer. The translating module 420 may be configured to translate, by the configurable gateway layer, the first authentication model to the second authentication model.

According to exemplary embodiments, the transmitting module 420 may be configured to transmit, response to translating, via the configurable gateway layer, a message to the second application 409(2).

According to exemplary embodiments, the communication module 424 may be configured to automatically establish a communication between the first application 409(1) and the second application 409(2) in response to receiving the message by the second application 409(2).

According to exemplary embodiments, the configurable gateway layer may be implemented between the first application 409(1) and the second application 409(2).

According to exemplary embodiments, in response to translating, the first authentication model may become compatible with the second authentication model to automatically establish the communication between the first application 409(1) and the second application 409(2).

According to exemplary embodiments, the configuring module 426 may configure the load balancer 411 to route the request from the first application 409(1) to the configurable gateway layer.

According to exemplary embodiments, when the first application 409(1) wants to communicate with the second application 409(2) for a first time, a process may include causing the first application 409(1) to send a request to the configurable gateway layer, without an access token, that the first application 409(1) wants to communicate with the second application 409(2). The communication module 424 may be configured to send a request from the configurable gateway layer to an authentication server 404 for validating the request sent by the first application 409(1). The authentication server 404, by utilizing the validating module 428, may validate the request sent by the first application 409(1) based on verifying credential data of a user of the first application.

Figure 5:
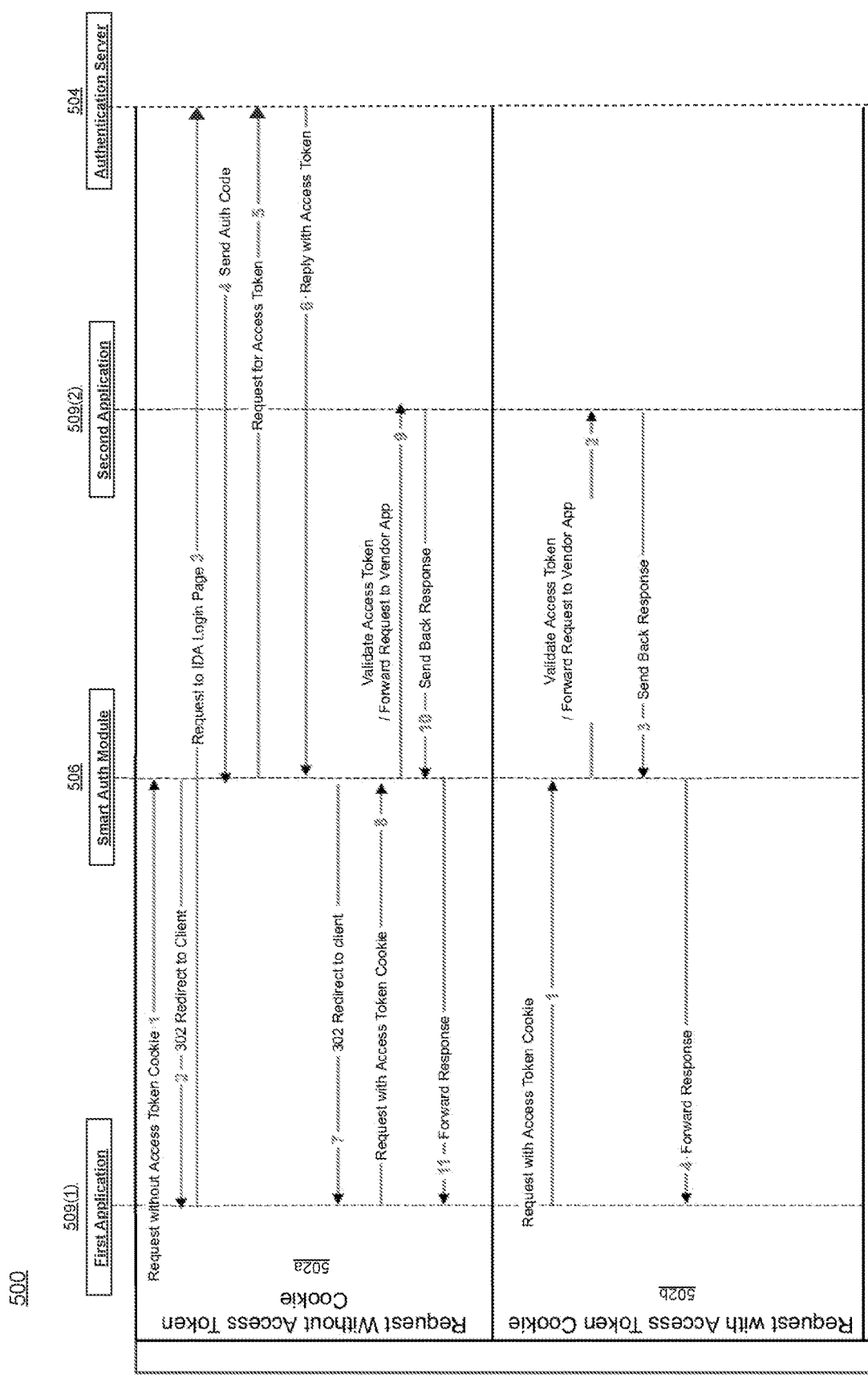
FIG. 5 illustrates an exemplary authentication flow diagram in accordance with an exemplary embodiment.

For example, FIG. 5 illustrates an exemplary authentication flow diagram 500 in accordance with an exemplary embodiment. As illustrated in FIG. 5, the flow diagram 500 illustrates a process 502(a) in a use case where the first application 509(1) sends a request to the second application 509(2) without an accessing token; and a process 502(b) in a use case where the first application 509(1) sends a request to the second application 509(2) with an accessing token.

For example, as illustrated in the process 502(a), at step 1, the first application 509(1) may send a request to the smart authentication module (SAM) 506 (an access token is not set) that the first application 509(1) wants to communicate with the second application 409(2). According to exemplary embodiments, the SAM 506 as illustrated in FIG. 5 may be the same or similar to the SAM 406 as illustrated in FIG. 4. The SAM 506 may utilize configurable gateway layer.

At step 2 of the process 502(a), a 302 redirect to an authentication server 504, i.e., an Active Directory Federation Services (ADFS) login page is sent to the first application 509(1), but the disclosure is not limited thereto.

At step 3 of the process 502(a), the first application 409(1) sends a request to the ADFS when username and/or password of a user of the first application 509(1) is input in the ADFS login page.

At step 4 of the process 502(a), the ADFS validates the request and send an authorization code to the SAM 506.

At step 5 of the process 502(a), the SAM 506 sends the authorization code to the ADFS (i.e., the authentication server 504) and requests for an access token.

At step 6 of the process 502(a), the ADFS validates the authorization code and sends the access token to the SAM 506.

At step 7 of the process 502(a), the SAM 506 sets an access token and sends a 302 redirect to the SAM 506 hack to the first application 409(1).

At step 8 of the process 502(a), the first application 509(1) sends a request to the ADFS (i.e., the authentication server 504) with the access token set.

At step 9 of the process 502(a), the ADFS (i.e., the authentication server 504) validates the access token based on the received access token set from the first application 509(1). When the ADFS (i.e., the authentication server 504) determines that the access token is valid, the ADES (i.e., the authentication server 504) retrieves username and/or roles from the access token and sets appropriate headers to request forwarded to the second application 409(2). According to exemplary embodiments, appropriate headers may mean username and/or roles headers specific to every application.

At step 10 of the process 502(a), the second application 509(2) may receive the request and authenticate/authorize by looking at headers in the forwarded request and send back a response to the SAM 506.

At step 11 of the process 502(a), the ADES (i.e., the authentication server 504) receives a response from the second application 509(2), and as per the nature of a reverse proxy, forwards the response to the first application 509(1).

As illustrated in FIG. 5, the process 502(b) illustrates a use case where the first application 509(1) sends a request to the second application 509(2) with an accessing token.

As illustrated in the process 502(b), at step 1 of the process 502(b), the first application 509(1) sends a request to the ADES (i.e., the authentication server 504) with an access token set.

At step 2 of the process 502(b), the ADES (i.e., the authentication server 504) validates the access token based on the received access token set from the first application 509(1). When it is determined that the access token is valid, the SAM 506 retrieves username and/or roles from the access token and sets appropriate headers to request forwarded to the second application 409(2). According to exemplary embodiments, appropriate headers may mean username and/or roles headers specific to every application.

At step 3 of the process 502(b), the second application 509(2) may receive the request and authenticate/authorize by looking at headers in forwarded request and send back a response to the SAM 506.

At step 4 of the process 502(a), the ADFS (i.e., the authentication server 504) receives a response from the second application 509(2), and as per the nature of a reverse proxy, forwards the response to the first application 509(1).

Figure 6:
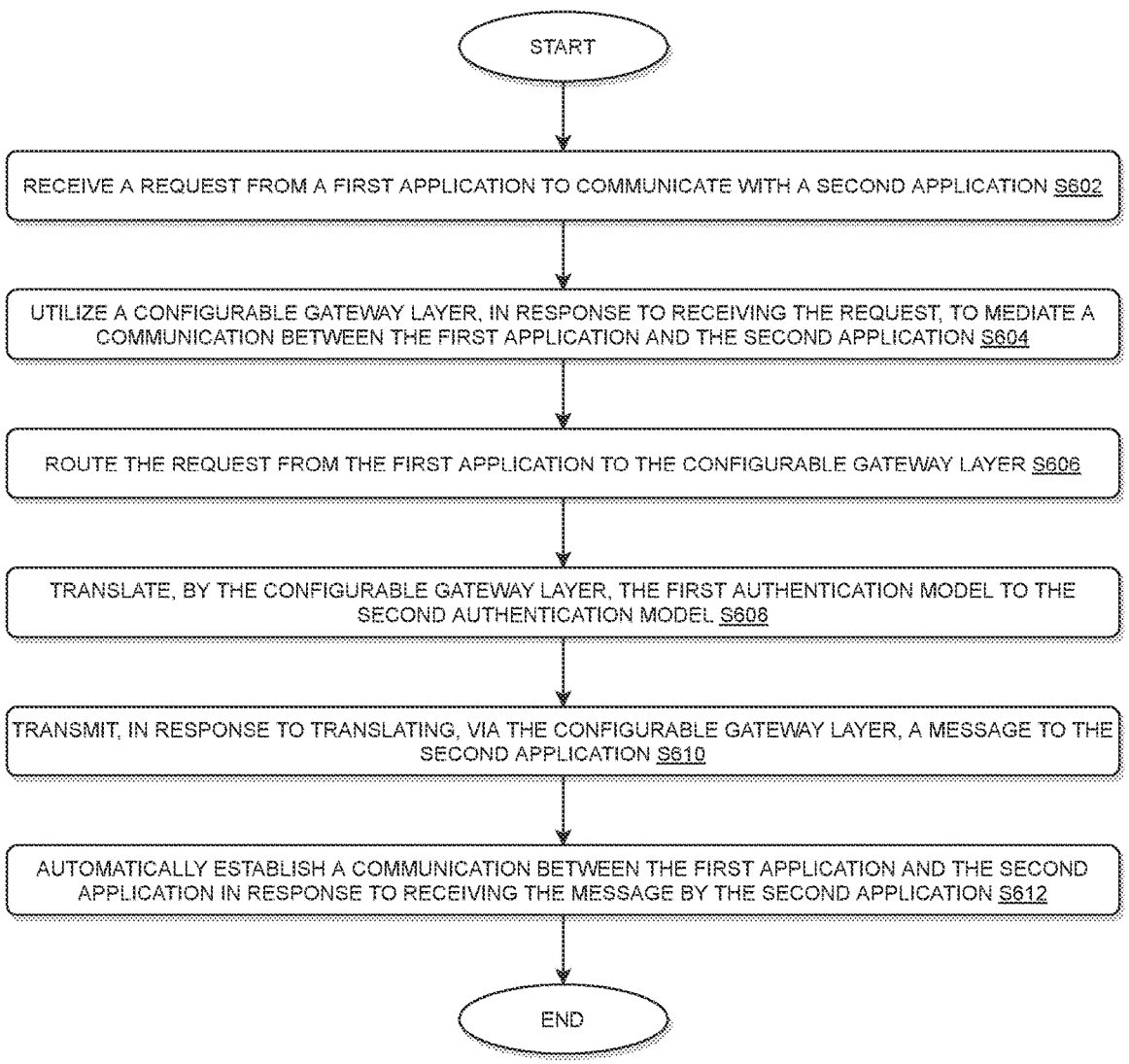
FIG. 6 illustrates an exemplary flow diagram for implementing a smart authentication module in accordance with an exemplary embodiment.

FIG. 6 illustrates an exemplary flow diagram implemented by the SAM 406/SAM506 for automatically establishing a communication between two or more applications that do not share a compatible authentication model, but the disclosure is not limited thereto.

In the process 600 of FIG. 6, at step S602, a request is received from a first application to communicate with a second application. The first application supports a first authentication model and the second application supports a second authentication model which is incompatible with the first authentication model.

At step S604, the process 600 may utilize a configurable gateway layer, in response to receiving the request, to mediate a communication between the first application and the second application.

At step S606, the process 600 may route the request from the first application to the configurable gateway layer.

At step S608, the process 600 may translate, by the configurable gateway layer, the first authentication model to the second authentication model.

At step S610, the process 600 may transmit, in response to translating, via the configurable gateway layer, a message to the second application.

At step S612, the process 600 may automatically establish a communication between the first application and the second application in response to receiving the message by the second application.

According to exemplary embodiments, when the first application wants to communicate with the second application for a first time, the process 600 may further include: causing the first application to send a request to the configurable gateway layer, without an access token, that the first application wants to communicate with the second application; sending a request from the configurable gateway layer to an authentication server for validating the request sent by the first application; and validating, by the authentication server, the request sent by the first application based on verifying credential data of a user of the first application.

According to exemplary embodiments, wherein in validating, the process 600 may further include: receiving an authentication code from the authentication server by the configurable gateway layer; sending a request with the authentication code by the configurable gateway layer to the authentication server for an access token; validating the authentication code by the authentication server; sending, in response to validating, the access token from the authentication server to the configurable gateway layer; sending the access token from the configurable gateway layer to the first application; causing the first application to send the request to the configurable gateway layer with the access token; validating the access token by the authentication server; and automatically establishing the communication between the first application and the second application in response to validating the access token.

According exemplary embodiments, wherein, when the first application wants to communicate with the second application with an access token, the process 500 may further include: causing the first application to send the request to the configurable gateway layer with the access token; validating the access token by the authentication server; and automatically establishing the communication between the first application and the second application in response to validating the access token.

According to exemplary embodiments, the SAD 402 may include a memory (e.g., a memory 106 as illustrated in FIG. 1) which may be a non-transitory computer readable medium that may be configured to store instructions for implementing the SAM 406 that provides an interface to utilize an easily configurable gateway layer that can translate between incompatible authentication models as disclosed herein. The SAD 402 may also include a medium reader e.g., a medium reader 112 as illustrated in FIG. 1) which may be configured to read any one or more sets of instructions, e.g., software, from any of the memories described herein. The instructions, when executed by a processor embedded within the SAM 406 or within the SAD 402, may be used to perform one or more of the methods and processes as described herein. In a particular embodiment, the instructions may reside completely, or at least partially, within the memory 106, the medium reader 112, and/or the processor 104 (see FIG. 1) during execution by the SAD 402.

For example, the instructions, when executed, may cause the processor 104 to perform the following: causing a receiver to receive a request from a first application to communicate with a second application, wherein the first application supports a first authentication model and the second application supports a second authentication model which is incompatible with the first authentication model; utilizing a configurable gateway layer, in response to receiving the request, to mediate a communication between the first application and the second application; routing the request from the first application to the configurable gateway layer; translating, by the configurable gateway layer, the first authentication model to the second authentication model; transmitting, in response to translating, via the configurable gateway layer, a message to the second application; and automatically establishing a communication between the first application and the second application in response to receiving the message by the second application, but the disclosure is not limited thereto.

According to exemplary embodiments, wherein, when the first application wants to communicate with the second application for a first time, the instructions, when executed, may further cause the processor 104 to perform the following: causing the first application to send a request to the configurable gateway layer, without an access token, that the first application wants to communicate with the second application; sending a request from the configurable gateway layer to an authentication server for validating the request sent by the first application; and validating, by the authentication server, the request sent by the first application based on verifying credential data of a user of the first application.

According to exemplary embodiments, wherein in validating, the instructions, when executed, may further cause the processor 104 to perform the following: receiving an authentication code from the authentication server by the configurable gateway layer; sending a request with the authentication code by the configurable gateway layer to the authentication server for an access token; validating the authentication code by the authentication server; sending, in response to validating, the access token from the authentication server to the configurable gateway layer; sending the access token from the configurable gateway layer the first application; causing the first application to send the request to the configurable gateway layer with the access token; validating the access token by the authentication server; and automatically establishing the communication between the first application and the second application in response to validating the access token.

According to exemplary embodiments, wherein, when the first application wants to communicate with the second application with an access token, the instructions, when executed, further cause the processor 104 to perform the following: causing the first application to send the request to the configurable gateway layer with the access token; validating the access token by the authentication server; and automatically establishing the communication between the first application and the second application in response to validating the access token.

According to exemplary embodiments as disclosed above in FIGS. 1-6, technical improvements effected by the instant disclosure may include platforms for implementing a smart authentication module that provides an interface to utilize an easily configurable gateway layer that can translate between incompatible authentication models, thereby automatically establishing a communication between two or more applications that do not share a compatible authentication model, but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed;

rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon viewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within be true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for automatically establishing a communication between two or more applications that do not share a compatible authentication model by utilizing one or more processors and one or more memories, the method comprising:

receiving a request from a first application to communicate with a second application, wherein the first application supports a first authentication model and the second application supports a second authentication model which is incompatible with the first authentication model;

configuring a load balancer to route the request from the first application to a configurable gateway layer;

utilizing the configurable gateway layer, in response to receiving the request, to mediate a communication between the first application and the second application;

translating, by the configurable gateway layer, the first authentication model to the second authentication model, wherein the first authentication model is incompatible with the second authentication model, wherein the first authentication model is a Security Assertion Markup Language (SAML) authentication model, and wherein the second authentication model is an OAuth authentication model;

transmitting, in response to the translating, via the configurable gateway layer, a message to the second application;
automatically establishing the communication between the first application and the second application in response to receiving the message by the second application, wherein the first application communicates with the second application with an access token, and the method further comprises:
causing the first application to send the request to the configurable gateway layer with the access token;
validating the access token by an authentication server, wherein the authentication server is a text file; and
automatically establishing the communication between the first application and the second application in response to validating the access token.

2. The method according to claim 1, wherein the configurable gateway layer is implemented between the first application and the second application.

3. The method according to claim 1, wherein, in response to the translating, the first authentication model becomes compatible with the second authentication model to automatically establish the communication between the first application and the second application.

4. The method according to claim 1, wherein, when the first application wants to communicate with the second application for a first time, the method further comprising:
causing the first application to send the request to the configurable gateway layer, without the access token, that the first application wants to communicate with the second application;
sending a request from the configurable gateway layer to the authentication server for validating the request sent by the first application; and
validating, by the authentication server, the request sent by the first application based on verifying credential data of a user of the first application.

5. The method according to claim 4, wherein the validating of the request sent by the first application further comprising:
receiving an authentication code from the authentication server by the configurable gateway layer;
sending the request with the authentication code by the configurable gateway layer to the authentication server for the access token;
validating the authentication code by the authentication server;
sending, in response to validating the authentication code, the access token from the authentication server to the configurable gateway layer;
sending the access token from the configurable gateway layer to the first application;
causing the first application to send the request to the configurable gateway layer with the access token;
validating the access token by the authentication server; and
automatically establishing the communication between the first application and the second application in response to validating the access token.

6. A system for automatically establishing a communication between two or more applications that do not share a compatible authentication model, the system comprising:
a receiver that receives a request from a first application to communicate with a second application, wherein the first application supports a first authentication model and the second application supports a second authentication model which is incompatible with the first authentication model; and
a processor operatively coupled to the receiver via a communication network, wherein the processor is configured to execute the following:
configure a load balancer to route the request from the first application to a configurable gateway layer;
utilize the configurable gateway layer, in response to receiving the request, to mediate a communication between the first application and the second application;
translate, by the configurable gateway layer, the first authentication model to the second authentication model, wherein the first authentication model is incompatible with the second authentication model, wherein the first authentication model is a Security Assertion Markup Language (SAML) authentication model, and wherein the second authentication model is an OAuth authentication model;
transmit, in response to the translating, via the configurable gateway layer, a message to the second application;
automatically establish the communication between the first application and the second application in response to receiving the message by the second application, wherein the first application communicates with the second application with an access token, and the processor is further configured to:
cause the first application to send the request to the configurable gateway layer with the access token;
validate the access token by an authentication server, wherein the authentication server is a text file; and
automatically establish the communication between the first application and the second application in response to validating the access token.

7. The system according to claim 6, wherein the configurable gateway layer is implemented between the first application and the second application.

8. The system according to claim 6, wherein, in response to the translating, the first authentication model becomes compatible with the second authentication model to automatically establish the communication between the first application and the second application.

9. The system according to claim 6, wherein, when the first application wants to communicate with the second application for a first time, the processor is further configured to:
cause the first application to send the request to the configurable gateway layer, without the access token, that the first application wants to communicate with the second application;
send a request from the configurable gateway layer to the authentication server for validating the request sent by the first application; and
validate, by the authentication server, the request sent by the first application based on verifying credential data of a user of the first application.

10. The system according to claim 9, wherein in validating the request sent by the first application, the processor is further configured to:
receive an authentication code from the authentication server by the configurable gateway layer;
send the request with the authentication code by the configurable gateway layer to the authentication server for the access token;

validate the authentication code by the authentication server;

send, in response to validating the authentication code, the access token from the authentication server to the configurable gateway layer;

send the access token from the configurable gateway layer to the first application;

cause the first application to send the request to the configurable gateway layer with the access token;

validate the access token by the authentication server; and automatically establish the communication between the first application and the second application in response to validating the access token.

11. A non-transitory computer readable medium configured to store instructions for automatically establishing a communication between two or more applications that do not share a compatible authentication model, wherein, when executed, the instructions cause a processor to perform the following:

causing a receiver to receive a request from a first application to communicate with a second application, wherein the first application supports a first authentication model and the second application supports a second authentication model which is incompatible with the first authentication model;

configure a load balancer to route the request from the first application to a configurable gateway layer;

utilize the configurable gateway layer, in response to receiving the request, to mediate a communication between the first application and the second application;

translating, by the configurable gateway layer, the first authentication model to the second authentication model, wherein the first authentication model is incompatible with the second authentication model, wherein the first authentication model is a Security Assertion Markup Language (SAML) authentication model, and wherein the second authentication model is an OAuth authentication model;

transmitting, in response to the translating, via the configurable gateway layer, a message to the second application;

automatically establishing the communication between the first application and the second application in response to receiving the message by the second application, wherein the first application communicates with the second application with an access token, and the instructions, when executed, further cause the processor to perform the following:

causing the first application to send the request to the configurable gateway layer with the access token;

validating the access token by an authentication server, wherein the authentication server is a text file; and automatically establishing the communication between the first application and the second application in response to validating the access token.

12. The non-transitory computer readable medium according to claim 11, wherein, in response to the translating, the first authentication model becomes compatible with the second authentication model to automatically establish the communication between the first application and the second application.

13. The non-transitory computer readable medium according to claim 11, wherein the configurable gateway layer is implemented between the first application and the second application.

14. The non-transitory computer readable medium according to claim 11, wherein, when the first application wants to communicate with the second application for a first time, the instructions, when executed, further cause the processor to perform the following:

causing the first application to send the request to the configurable gateway layer, without the access token, that the first application wants to communicate with the second application;

sending a request from the configurable gateway layer to the authentication server for validating the request sent by the first application; and validating, by the authentication server, the request sent by the first application based on verifying credential data of a user of the first application.

15. The non-transitory computer readable medium according to claim 14, wherein in validating the request sent by the first application, the instructions, when executed, further cause the processor to perform the following:

receiving an authentication code from the authentication server by the configurable gateway layer;

sending the request with the authentication code by the configurable gateway layer to the authentication server for the access token;

validating the authentication code by the authentication server;

sending, in response to validating the authentication code, the access token from the authentication server to the configurable gateway layer;

sending the access token from the configurable gateway layer to the first application;

causing the first application to send the request to the configurable gateway layer with the access token;

validating the access token by the authentication server; and automatically establishing the communication between the first application and the second application in response to validating the access token.

* * * * *